United States Patent Office

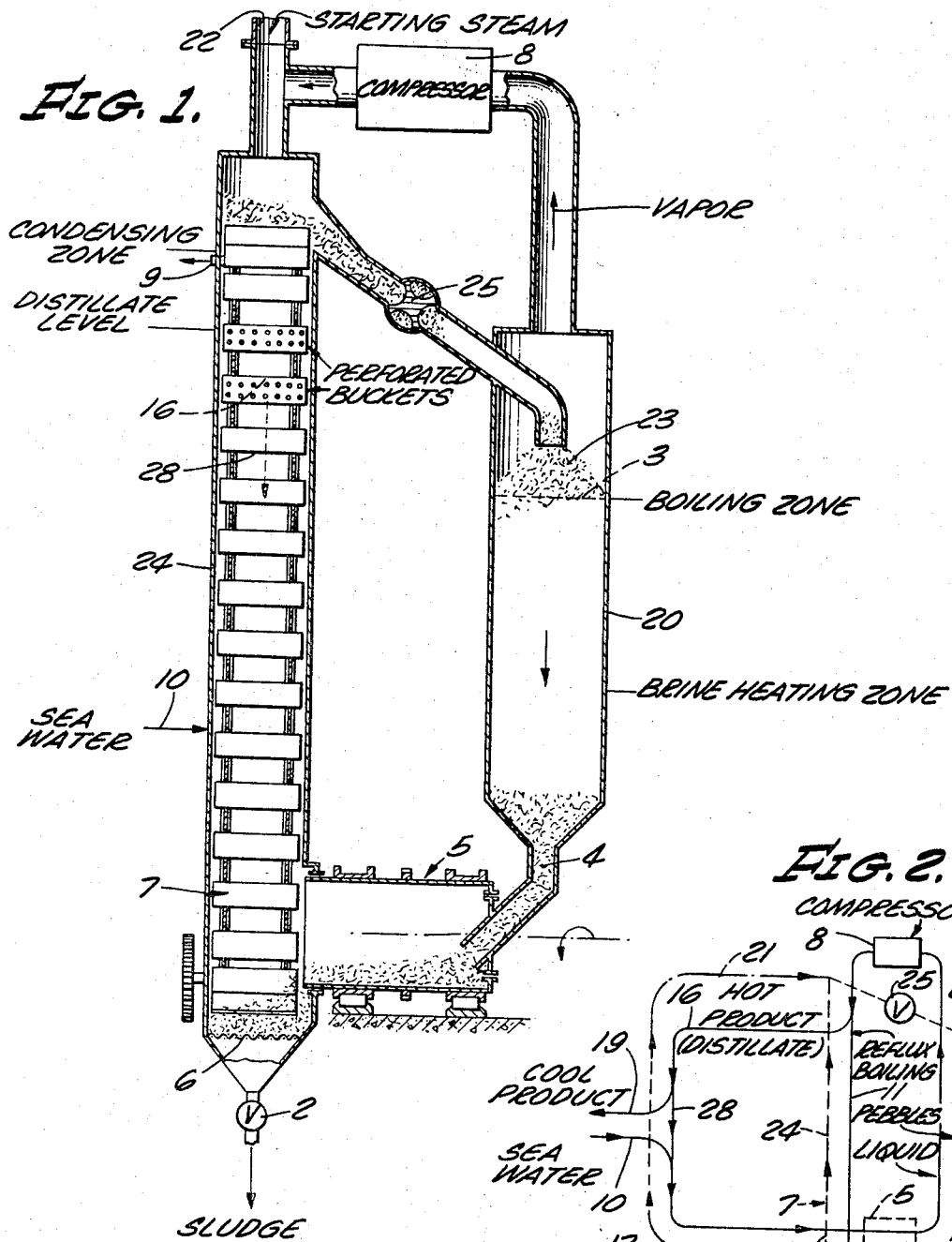
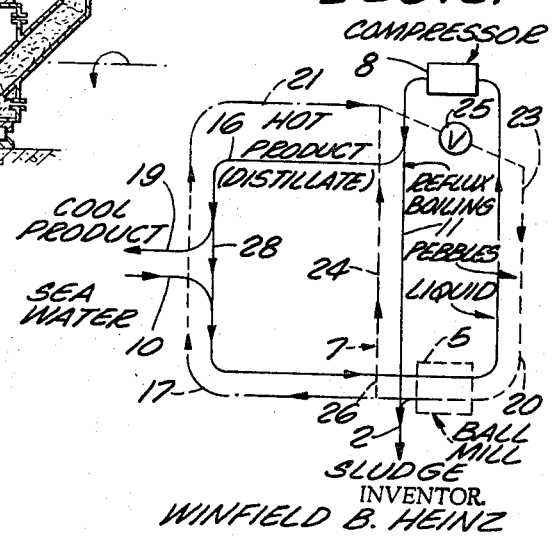

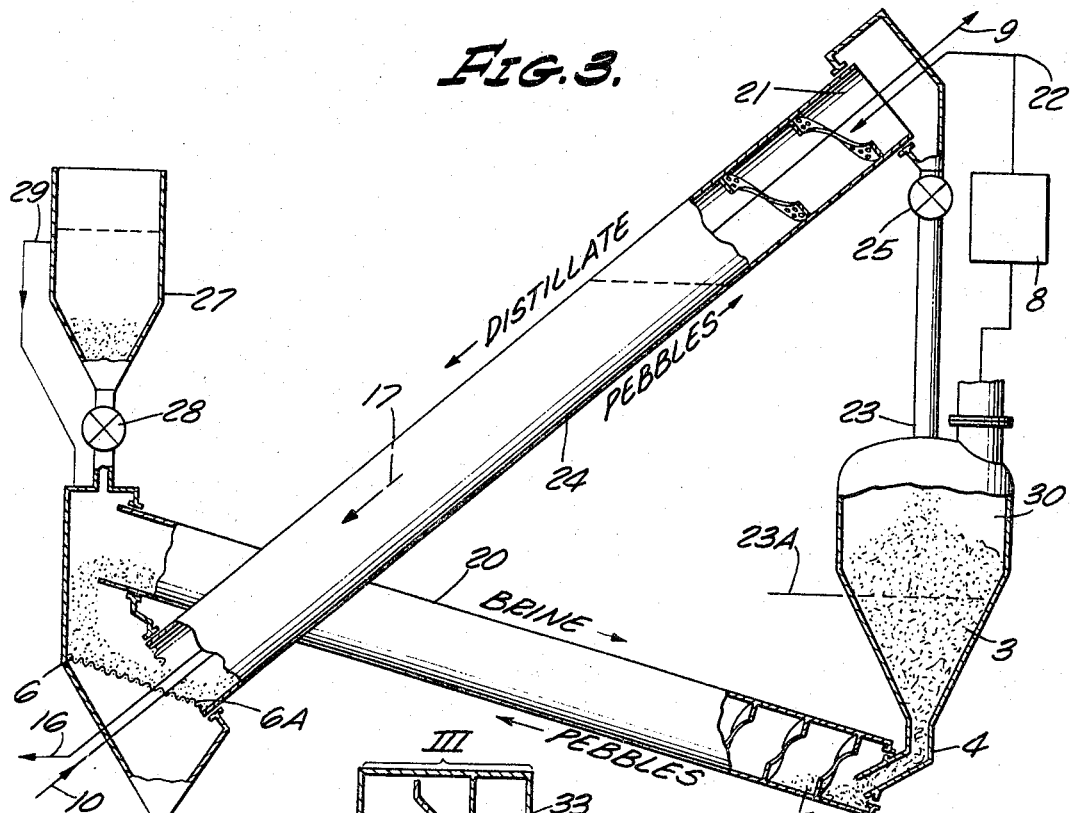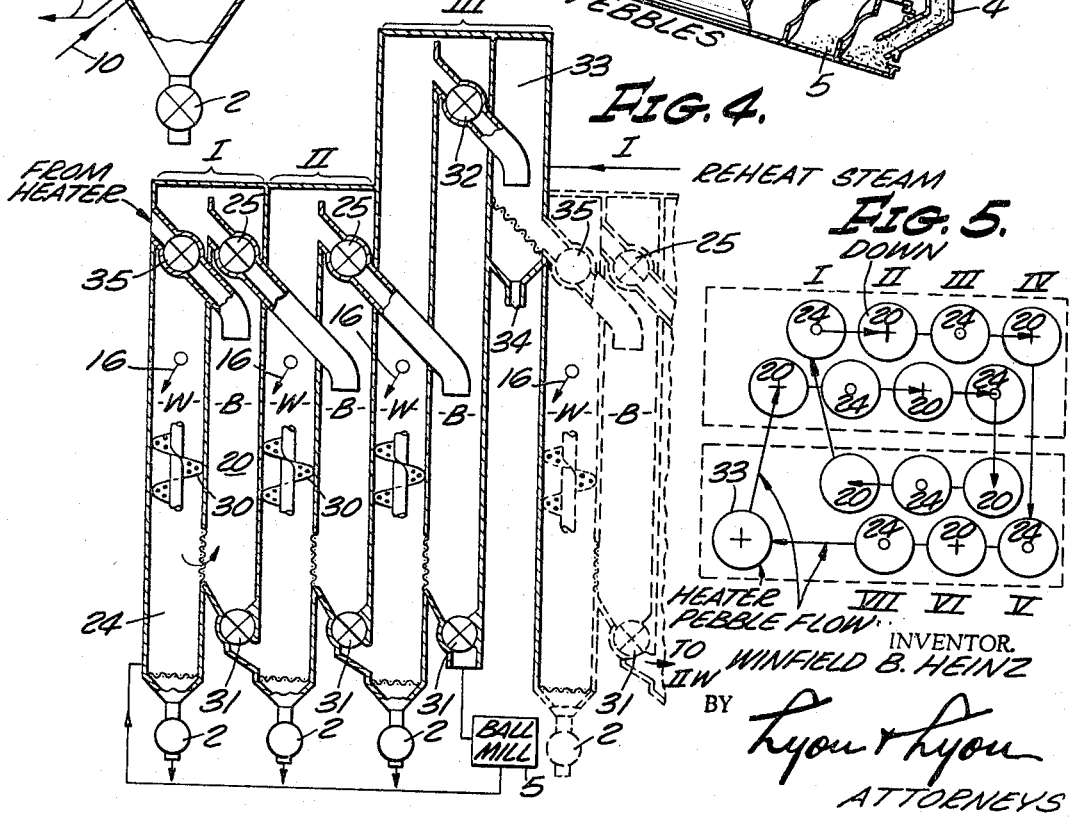

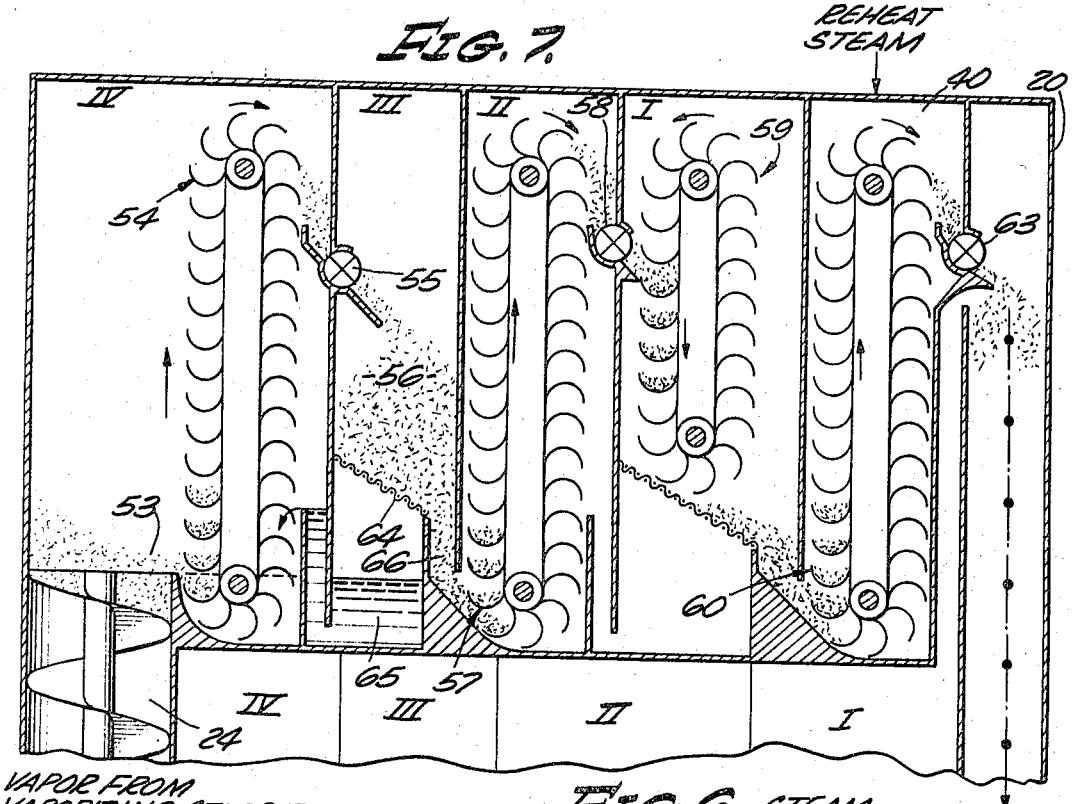
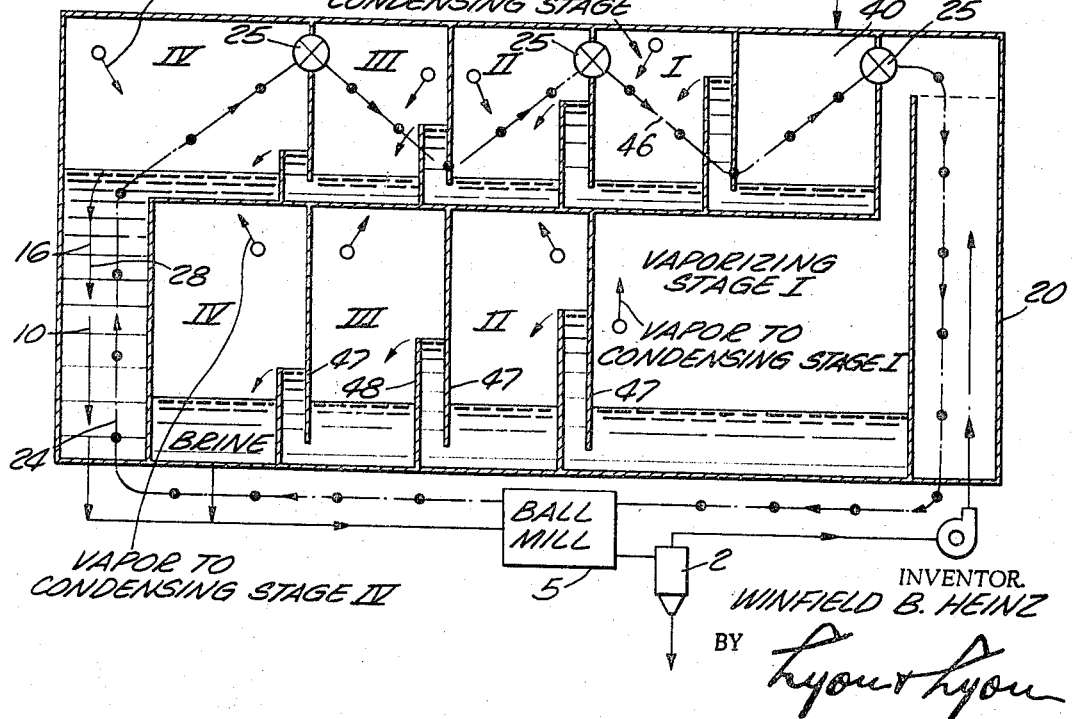

3,442,769
Patented May 6, 1969

3,442,769
METHOD AND APPARATUS FOR HEATING AND DISTILLING SALINE WATER USING HEATED PEBBLES
Winfield B. Heinz, 11444 Bolas St.,
Los Angeles, Calif. 90049
Filed Oct. 22, 1965, Ser. No. 501,244
Int. Cl. C02b 1/06; B01d 3/08
U.S. Cl. 203—7                               9 Claims This invention relates to distillation and evaporation of liquids from solutions or slurries. It is applicable to distillation in evaporation processes for the recovery of the vapor phase, a dissolved solid phase, or of both. This invention is also applicable to processes for concentrating solutions or slurries.

This invention particularly relates to pebble heating, specifically to processes using solid particulate matter or "pebble" heating in which deposits formed upon the pebbles are removed during the recycling of the pebbles through the process.

All well known processes for separating fresh water from solutions of salt by distillation are handicapped by scale forming on the heat exchanging surfaces. The scaling causes trouble both by reducing heat transfer conductance and by requiring cleaning and replacement of the heating tubes. These operations are costly not only because of labor and materials, but also because of loss of equipment operating time during the cleaning and descaling processes.

In most water distillation processes, it would be advantageous to design for higher presures and temperatures. These feasible operating temperatures are now limited because there is more scaling on the heat transfer surfaces at higher temperatures than at lower temperatures.

Furthermore, in water distillation processes it would be advantageous to remove a larger portion of the water as product than is now feasible. Here, again, scaling is the limiting consideration, and because of it only one-half to two-thirds of the water in sea water is customarily recovered. The rest is discharged to waste as blowdown. High blowdown is costly because heat is also lost with it or recovered from it through additional heat exchange surfaces. It is also under disadvantages because in inland locations the waste is often difficult and costly to dispose of.

The region of Roswell, N. Mex., is an example. Here huge reserves of high salinity water underlie millions of acres of land throughout the Southwest. Recovering two-thirds of it as fresh water, by present processes, would leave one-third of the brine to accumulate in artificial salt lakes or be returned underground. Disposing of 100 tons per million gallons in the sludge form would be simpler and less costly. There are other inland sources of concentrated brines from which it would be advantageous to remove fresh water only if the scaling problem could be avoided. Such examples are the Great Salt Lake and the Dead Sea.

Numerous approaches have been tried in an effort to reduce this scaling problem. They include pretreatment (softening) the raw feed water; acid addition, both continuously and periodically; addition of other chemicals; preferential deposition of scale upon nuclei afforded by suspended particles in various sizes, sometimes as a separate process step and some times as an inprocess slurry; and other methods. None are satisfactorily successful, all are costly and all leave the distillation processes limited in various ways.

The present invention contemplates the removal of these limitations by causing substantially all the scale to form on the surfaces of solid particulate matter or "pebbles" used for transferring all required heat into and out of the scale-forming waters. Pebbles move countercurrent to liquid streams, passing out of the scale-forming zones and through scale removal and washing zones. Thereafter, they continue in countercurrent flow through the cool, incoming sea water and through a stream of fresh water used for final washing of the pebbles.

The term "pebbles" or "solid particulate matter" as used herein denotes any solid material of flowable size and form having strength which is suitable to carry large amounts of heat from the pebble-heating chambers to the liquid-heating chamber without rapid deterioration or substantial breaking.

The principal advantage of systems in which scale formation does not impose design constraints is that economies available through design for higher temperatures can be accepted. In compression distillation at 500° F., saturated vapor temperatures, for example, the volume of vapor is only 1/44 that at 200° F., only half as much shaft energy per degree temperature rise is required, and the necessary compression ratio is 20% less. These considerations contribute to substantial reductions in dimensions and capital cost of compressors and of their power requirements.

In other distillation processes, such as multieffect and multistage flash, higher thermal efficiency can be achieved through the use of higher total temperature ranges permissible by avoiding the scaling problem at elevated temperatures. The magnitudes of disadvantages are illustrated by comparing Carnot efficiencies at two different peak temperatures. The highest sea water boiling temperature considered feasible in large scale plants now being designed is in the vicinity of 250° F., namely, 710 R. With a sea water temperature of, said 70° F. (350 R.), the Carnot efficiency is (710—530)/710=0.25.

In a plant designed for 500° F., a nominal temperature for use in the several embodiments of the present invention, the Carnot efficiency would be (960 R.—530 R.)/960=0.45. This represents an 80% increase in Carnot efficiency. The corresponding increase in the energy available permits more economical combinations of temperature drop between distillation effects and number of effects in multieffect distillation systems. The same advantage is experienced in multistage flash distillation systems.

The principal object of the present invention is to provide a saline water distillation plant capable of producing large quantities of fresh water from any available source of saline water of any composition at minimum total cost of the water produced.

A further principal object of the present invention is to provide such a plant in which amortization and energy costs are low and in which operation and maintenance costs are especially favorable in comparison with other plants processing the same saline water.

A still further object of the present invention is to provide a means where all heat transferred to or from the salt water passes only through the pebble surface. The scale forms almost entirely on the pebbles which are cleaned during each pass through the system.

A still further object of the present invention is to provide a means whereby the salt water is evaporated nearly to dryness which avoids the necessity of discharging large volumes of brine.

A still further object of the present invention is to provide a distillation apparatus where there is no need for surface heat exchangers, and thus no circulating pumps.

A still further object of the present invention is to provide a means whereby, as the pebbles wear out, the resulting fines are discharged continuously with the sludge, and makeup pebbles are introduced continuously under automatic control. Thus, there need be no down time for cleaning and replacement of the heat exchanger surfaces.

A still further object of the present invention is to provide a distillation apparatus and process which requires no separate deaeration of the sea water.

A further object of the present invention is to provide a device where saline waters of any kind and concentration can be distilled.

A still further object of the principal invention is to provide a device designed for higher temperatures, which are acceptable because the scale can be handled. Thus, economies appear as reduction of compressor cost and power in thermocompression systems and as lower heat consumption in multieffect and multistage flash systems because of the increased thermodynamic efficiency inherent in the higher temperature range.

These and other objects and advantages of the invention will become apparent from the following detailed description, taken with the accompanying drawings, wherein:

FIGURE 1 illustrates a compression distillation system utilizing the present invention. It incorporates two stationary columns, one equipped with a bucket elevator, the two columns being connected at the bottom by a rotating ball mill.

FIGURE 2 is a schematic diagram illustrating how a third column containing a pebble elevator is used to cool the distillate by transferring its heat to pebbles which have been cooled by incoming sea water.

FIGURE 3 illustrates another embodiment of the invention in a compression distillation plant. Here, however, the elevator column is replaced by an inclined rotating cylinder, and the pebble mill section is elongated. This figure also illustrates means for charging pebbles into the system and for maintaining the correct quantity of pebbles therein.

FIGURE 4 illustrates an embodiment of the present invention in a multieffect distillation plant. Here the pebbles are passed progressively from one stage to another at lower relative temperature until, after the lowest temperature effect, the pebbles are reheated by direct contact with steam from a separate source. Thus, in the system of FIGURE 4 the energy required to maintain the system in equilibrium is introduced as thermal energy, whereas in FIGURES 1, 2, and 3 the corresponding energy enters as shaft power converted to compression energy.

FIGURE 5 schematically illustrates one of the numerous alternative geometrical arrangements of the several effects in a multieffect plant, shown in plan as a top view. This figure shows a geometrical arrangement by means of which the lowest-temperature effect and subsequent reheat section are closely adjacent to the highest-temperature effect, thus minimizing the distance through which pebbles must be transported in order to close the physical and thermodynamic loops.

FIGURE 6 illustrates an adaptation of the present invention to a multistage flash distillation plant.

FIGURE 7 supplements FIGURE 6 in illustrating structure capable of transporting pebbles from stage to stage as represented schematically in FIGURE 6.

Referring now to FIGURE 1, a vertical column 20 is filled with pebbles which come in at the top of the column and go out at the bottom. There they pass through ball mill 5 where tumbling action among the pebbles grinds off scales deposited on them. Milled pebbles and accompanying fine materials are discharged at the base of the bucket elevator 7. The pebbles are carried upward by the elevator while the scale settles through the perforated buckets and the screen 6 to a sump, from which the fine material is removed as sludge.

Raw sea water or other saline water enters the system at 10, keeping it filled to levels which are established by the pressure distribution throughout the system and by suitable control, preferably automatic.

Operation of this distillation plant is started by introducing steam from a separate source at 22. Hot, clean pebbles are delivered to column 20 at 23, falling on top of a pile which extends above the boiling zone 3. Pebbles are continually being taken out from the bottom of the column by transfer through ball mill 5, and thus the entire mass settles continually into the brine. Boiling commences below the surface and proceeds upwardly as necessary to convert heat from the pebbles into latent heat of vaporization. Entrained droplets are caught by the pile of dry pebbles and vaporized there, leaving substantially all of the dissolved solids upon the pebble surfaces.

The vapor, slightly superheated, passes to compressor 8 where its pressure and temperature are increased before discharge into the elevator column 24. Return of the vapor to the compressor inlet is prevented by rotary valve 25 which conveys hot pebbles from column 24 to column 20. The compressed vapor condenses upon cool, clean pebbles at 9, and the ensuing distillate flows downward through the rising pebbles in column 24.

Those pebbles are being elevated by the perforated bucket elevator 7, countercurrent to a downward stream comprising feed water and a reflux portion of the distillate stream.

Thus, we have in column 24 a downwardly flowing liquid mass comprising pure water at the top and saturated brine at the bottom. Column 24 also contains a stream of pebbles which move upward from a slurry of particles suspended in saturated salt solution. As the pebbles rise, they are washed by the downflow of water until at some region in column 24 the pebbles and the water pass through a transition zone in which the water salinity diminishes from a high value to a low value.

At a desired salinity level a product water stream 16 is removed. Depending upon the product salinity selected, the pebbles are further cleaned as they progress from there upward to the top where they are met by incoming, high-temperature water vapor. Condensation of this vapor reheats the pebbles along with the starting steam, after which they pass through rotary valve 25 and commence a new cycle.

Cool, saturated brine at the bottom of column 24 passes into ball mill 5 where it starts receiving heat from the downcoming pebbles from column 20. As the brine flows upward through column 20 in countercurrent heat exchange with the decending column of pebbles, the brine becomes heated while the pebbles become cooled. As the brine flow progresses upward, it approaches the boiling temperature, and, on reaching the boiling zone, commences to vaporize. In doing so, it deposits a thin film of scale upon the pebble surfaces, this scale ultimately comprising the total solid content of the saline water feed. All of these solids are left behind when the vapor leaves the pebble bed at 23, except a trace of microscopic salt dust which carries over in the superheated vapor. Noncondensable gases are vented at 9.

In FIGURE 1 the flow of pebbles entering column 20 at 23 must be large enough to carry heat needed to evaporate the water, which is boiled at 3. The heat absorbed from this large flow of pebbles by the stream of sea water, as its temperature rises to the boiling point at 3, is relatively smaller. Consequently, substantial amounts of heat remain in the pebbles after they have passed the sea water entry point 10, and remaining capacity of the pebbles for cooling the downcoming condensate is relatively small. Consequently, the temperature of the product water at 16 is substantially higher than that of the sea water entering at 10. It is important for thermal economy that as much as possible of this heat be retained in the distillation system. The arrangements illustrated schematically by FIGURE 2 achieve this objective.

In FIGURE 2 the solid lines represent the flow of liquid and/or vapor, whereas the dash lines represent the pebble flow. The pebble flow which passes down through column 20 is divided between two elevators at 26, elevator 7 being the same as that shown in FIGURE 1. This elevator carries typically more than half the total pebble flow, and within it the reflux flow of distillate 11 flows downward and washes the pebbles as they rise into the condensing zone 21.

A smaller portion of the total pebble flow passes from region 26 into elevator 17 where it is washed first by sea water 10 and next by reflux 28. This relatively small flow of pebbles is cooled to a temperature approaching that of the sea water at 10, after which they cool the product water before it is discharged at 19. Heat received from the product water is carried by the pebbles to the condensing zone at 21, where further heat is received by condensing of vapor discharged by compressor 8. The total flow of pebbles passes downward through rotary valve 25 and repeats the cycle described.

The embodiment of the invention illustrated by FIGURE 3 differs from FIGURE 1 in structural configuration. Here, instead of the fixed columns shown in FIGURE 1 at 20 and 24, there are two rotating cylinders. Each of these cylinders is equipped with internal spiral flights causing the pebbles to move upward. The flights in cylinder 24 are perforated in order that fine material can pass downward with the liquid flow, out through sludge screen 6a, for ultimate discharge through rotary valve 2. In this embodiment, however, the boiling zone and the vapor release section are contained in a fixed vertical vessel 3 into which hot, cleaned pebbles are charged through rotary valve 25. Brine boiling at 3 deposits sodium chloride and scale-forming compounds on the pebbles which then pass downward into the pebble-milling section 5. Here the scale is loosened from the pebble by tumbling action, and, as the mass of solid material is moved toward sludge screen 6, soluble sodium chloride is redissolved in the downcoming brine approaching the boiling zone. However, as the sodium chloride is also to be discharged as sludge through rotary valve 2, along with insoluble scale and residue from worn pebbles, the brine is saturated all the way from the boiling zone to the sludge screens 6 and 6a.

As the liquid recedes upwardly into cylinder 24, the sodium chloride and other soluble crystals redissolve in the downcoming liquid stream comprising sea water feed which enters at 10 and the reflux stream 17 which washes sea water from the pebbles.

Vapor released at 30 is compressed at 8 and condensed upon cool, clean pebbles at 21. Noncondensables are removed at 9 through a pipe which extends axially within the rotating cylinder 24.

As pebbles are worn away they are discharged as sludge at 2. Replacement pebbles are added from the storage vessel 27 through rotary valve 28, operated as required to maintain substantially constant pebble level at 30. This can be done manually, if desired; however, it is more desirable to have the rotary valve 28 actuated automatically in response to a measurement of pebble level 30. As rotary valve 28 moves pebbles downwardly, it also moves liquids upwardly. Return line 29 is therefore provided. Noncondensables released from the brine also escape upwardly through valve 28 and return line 29 to the atmosphere at the top of vessel 27.

Product water withdrawn at 16 is at relatively high temperature for reasons set forth in the description of the distillate cooling column illustrated in FIGURE 2. When economic considerations justify inclusion of this cooling step in the process of FIGURE 3, a corresponding liquid to pebble heat transfer element is combined with FIGURE 3. This element may either be fixed, as in column 24 in FIGURE 1, or rotated, as in cylinder 24 in FIGURE 3. Its flow connections are in each case the same as those shown by FIGURE 2.

FIGURE 4 illustrates a multieffect evaporation system comprising three effects, this number being selected strictly for purpose of illustration. The number of effects can be increased to any value which achieves minimum cost of total water produced, additional effects being individually the same as effects I through III as shown, although not necessarily identical in dimensions. It should be noted that effect I is shown a second time in dotted lines at the right of FIGURE 4. The reason for this is that in a well-designed plan, several effects are arranged geometrically in a fashion so that the last effect is adjacent to the first effect. This avoids long transportation distances for pebbles and liquids between the two effects. A typical arrangement is shown by FIGURE 5, in which the pebble flow through the effects in sequence is indicated by the arrows.

In FIGURE 4 another variation is shown. Ball mill 5 and pebble elevator 7 (FIGURE 1) have been replaced in each effect by a screw elevator 30, which creates both the tumbling action needed to remove scale from the pebbles, and the elevating action required to lift the pebbles in countercurrent flow through the downwardly moving water. The spiral flights of this screw elevator are perforated in order that fine material can pass downwardly with the water while pebbles are moved upwardly.

Each screw elevator 30 may be a single screw or it may comprise two counterrotating left and right hand screws intermeshed and geared together to maintain synchronization.

Each effect in FIGURE 4 comprises two columns, 20 and 24, corresponding to columns 20 and 24 in FIGURE 1. Column 20 is hereinafter referred to as the boiling section and column 24 as the washing section.

In FIGURE 4 pebbles reaching the top of section W–I condense vapor from section B–I. On thus having been heated, the pebbles pass through rotary valve 25 into section B–II, wherein the vapor pressure is lower than that in effect I. Thus brine rising in section B–II is boiled by contact with pebbles received from effect I. At the bottom of section B–I, scaled pebbles are transferred through rotary valve 31 to the base of spiral elevator 30 in section W–II. Here the pebbles are milled by tumbling action and subjected to countercurrent washing. The pebble cycle described proceeds in a similar fashion from effect to effect until the final effect, in which they are transferred from section W–III through rotary valve 32 to reheat section 33. Steam at elevated temperature and pressure, from a separate source, is admitted here where it reheats the pebbles by condensation. The condensed steam drains at 34 either as addition to product water or for return to the primary steam generator. Pebbles from reheat section 33 pass through rotary valve 35 into section B–I of the first effect, shown by dash lines at the right of FIGURE 4 in addition to the solid line showing at the left.

In situations wherein the milling action within elevators 30 is insufficient to remove scale satisfactorily, a ball mill (corresponding to ball mill 5 in FIGURE 1) is introduced between rotary valve 31 (FIGURE 4) and its discharge connection to its adjacent washing section. This can be done at any point in the sequence of effects which is most advantageous for the particular system design. Only one such ball mill is typically needed for a complete system because, even without milling in each washing section, the scale is leached substantially free of solubles, such as sodium chloride, and the remaining hard scale is of such small quantity that it has substantially no effect upon the heat transfer utility of the pebbles.

Calculations show that the total amount of solids from sea water deposited on pebble surfaces during one pass through each effect is in the order of one quarter ounce per square foot of pebble surface. Since most of this is sodium chloride, which is redissolved en route upward through the washing section, the total accumulation of hard scale during each cycle of pebbles through the largest contemplated number of successive effects has negligible influence upon heat transfer capability of the pebbles as they progress.

Because conduction of heat into and out of the pebbles themselves is proportional to their thermal conductivity and because the thermal conductivity of stone (as an example) is low compared to that of bronze and other materials typically used for heat exchanger tubes, the total amount of pebble surface provided is made large compared to that conventionally provided in tubular surface heat exchangers for corresponding duty.

Thermal conductivity of hard scale is in the same order of magnitude as that of stone. Consequently, small accumulations of hard scale have negligible effect upon the heat transfer characteristics and capabilities of the pebbles.

FIGURE 6 illustrates an embodiment of the present invention in which the same principles are applied to a multistage flash distillation system. In this system, the solution to be distilled is raised to its maximum temperature by counterflow heat exchange from hot pebbles entering at the top of column 20. The brine, heated to the boiling point, overflows at the top of brine heater 20 into vaporizing stage I, in which part of the water changes to vapor. That vapor passes through suitable entrainment separators (sometimes called "demisters") into condensing stage I, where it condenses on the pebbles moving through that stage as indicated at 46. Condensed vapor drains to the bottom of condensing stage I.

Brine from vaporizing stage I passes under submerged weir 47 and over weir 48, thus establishing a head of liquid which maintains a selected pressure difference between vaporizing stages I and II. On passing into the lower pressure region of vaporizing stage II, further vapor flashes from the brine and passes into condensing stage II. There it condenses on moving pebbles as in condensing stage I, the condensate draining to the bottom of the container as fresh water.

This sequence of process continues from stage to stage throughout as many stages as may be provided for minimum overall product water cost. Finally, from the last stage (vaporizing stage IV in FIGURE 6), the brine flow passes into ball mill 5, which also receives the flow of scale-covered pebbles from the bottom of brine heater 20. In this ball mill, the scale is loosened from the pebbles through tumbling action and is discharged as sludge with that discharge of brine which maintains desired balances of heat and salts in the system.

Raw sea water is fed into the system at 10 into washing section 24. This column contains an elevator such as shown in FIGURE 1, or the screw elevator shown in FIGURE 4, which lifts the pebbles in counterflow against the downcoming stream of sea water feed, reflux, and fresh water product in turn. In doing so, the pebbles are cooled to a temperature approaching that of the sea water. They then partially cool the product water before emerging into condensing stage IV, in which they commence their reheating cycle by condensing vapor received from vaporizing stage IV.

This heating of pebble flow continues from condensing stage to stage and finally through final heater 40, wherein high tempertaure steam from a separate outside source returns the pebbles to their initial temperature, at which they enter brine heater 20.

Requisite pressure differences are maintained between the several condensing sections by weirs through which the fresh water flows from higher to progressively lower temperature regions. The pebbles are passed into regions of higher pressure through rotary valves 25, as is done in other embodiments of the present invention.

FIGURE 6 indicates only schematically the passage of pebbles through the system, more detail being shown by FIGURE 7. This figure represents the condensing stages of FIGURE 6, with the upper portions of the corresponding vaporizing stages shown also.

At the upper part of washing stage 24, a spiral elevator moves the pebbles upward through the raw sea water feed and through a reflux of fresh water, upward to a level 53, from which the pebbles flow by gravity into bucket elevator 54 having perforated buckets. By this means, the clean, cool pebbles are carried upward through condensing stage IV, wherein vapor from vaporizing stage IV condenses upon the cooled pebbles, thus forming that portion of fresh water product.

At the top of its lift, bucket elevator 54 discharges the pebbles, now heated, into a hopper feeding rotary valve 55. This rotary valve transfers the pebbles into condensing stage III, where the pressure is higher than in stage IV. Thus, additional vapor received from vaporizing stage III condenses upon the same pebbles.

In condensing stage III the pebbles discharged by rotary valve 55 fall upon pile 56, in which vapor from vaporizing stage III condenses and flows downward, draining through screen 64 into condensate receiver 65.

Pressure differences between adjacent condensing stages are maintained by columns of liquid previously discussed with relationship to FIGURE 6. In FIGURE 7, pebbles flow from condensing stage III downward through water column 66 into bucket elevator 57 which, like other condensing elevators, has perforated buckets. Here in condensing stage II as in condensing stage IV, the pebbles are elevated through vapor received from vaporizing stage II. As the vapor condenses on the pebbles, it forms the product distillate and it further heats the pebbles before they are discharged by rotary valve 58 into condensing stage I.

Different from the arrangement shown in condensing stage III, as another means by which the invention can be implemented, pebbles entering condensing stage I from rotary valve 58 are carried downward by the bucket elevator 59. Thus their potential energy is transferred to the elevator 59 drive system, which is mechanically connected to the drive system for elevator 60 in the adjacent condensing stage. This condensing stage 40 achieves final heating of the pebble flow by means of high pressure steam supplied from a separated source. There the pebbles are elevated to their maximum temperature before being discharged through rotary valve 63 into the top of brine heater 20. In that heater, the pebbles proceed downwardly, transferring the heat to the upflowing brine stream, from which the principal scale deposit forms upon the pebble surfaces. The pebbles then proceed through the ball milling and washing operations previously described by reference to FIGURE 6.

It should be recognized that FIGURE 7 illustrates alternative means for achieving similar results, and the present invention does not require use of the combination illustrated. Means for causing vapor to condense upon pebbles illustrated for condensing stages III and I, for example, are two different means of achieving the same results. Either means can be used depending upon the design for individual circumstances.

In multistage flash distillation plants now in use producing fresh water from sea water, correct pressure conditions must be carefully maintained to avoid boiling in the brine heater. This is because, if boiling occurs, scale deposit on the heat transfer surfaces is accelerated. One of the notable advantages of the present invention is that, in the multistage flash plant of FIGURE 6, no difficulty can occur from boiling in the brine heater because scale is deposited only on the pebbles. Therefore, the problem of control is simplified, and, in the event of accidental deviation from the intended operating condition, there is no difficulty from scaling.

The present invention also contemplates other means for loosening scale deposits from the pebbles whereby mixtures of pebbles and liquid are passed through regions of high turbulence, as within a pump or any other type of high intensity stirrer, which will subject the mass to highly turbulent conditions under which scale deposited on the pebbles is loosened by abrasion and impact.

The present invention also should not be construed to imply the use of solid particulate matter of homogenous structure. It is sometimes advantageous to use material pigmented or intermixed with other material having desired properties. Thus it may be desirable to mold or otherwise form protective coatings of synthetic resins or other materials around slugs of solids having advantageous specific heats, densities, melting points, and heats of fusion.

The last-mentioned characteristic, namely, melting point and its associated heat of fusion, should be noted as another advantageous feature of this invention. When suitably encapsulated slugs of metallic lithium, for example, are used, its high heat of fusion is transferred once each cycle to boil brine and to condense vapor. With suitable control of temperatures in this system, condensing vapor melts the lithium and boiling brine freezes it. Thus, relatively large quantities of heat are transferred with small mass flow of the moving heat transport medium and with small requisite temperature differences. Both are favorable to low cost production of fresh water.

Where as all of the figures are based upon the use of moving heat transport medium in particulate form, the present invention also incorporates other forms of such material. Alternative forms can comprise continuous flexible fibers or rods, webbing, sheet, chain, and fabricated combinations, such as tubing filled with a second medium having desired mechanical and thermal properties. Moving heat transport medium in nonparticulate form can be handled by machinery of suitable design (rollers, pulleys, etc.), and it can be freed from scale by scraping, flexing, impact, brushing and the like, followed by countercurrent washing.

While the preferred embodiments of the invention have been illustrated and described herein, the invention is not to be construed as limited to the specific details disclosed herein, except as included in the following claims.

I claim:

1. A method of transferring heat to a solution in which solid matter is deposited upon the heat transfer means, comprising the steps of:
   heating a flow of solid particles;
   causing the heated solid particles to contact the solution to be heated in a counterflow relationship whereby solid matter from the solution is deposited upon the surfaces of said solid particles;
   abrading and impacting said solid particles to loosen the deposited solid matter therefrom;
   causing the abraded and impacted solid particles to contact incoming solution in a counterflow relationship to wash the loosened deposited solid matter from the solid particles; and
   reheating the cleaned solid particles for further contact with a solution to be heated.

2. A method of transferring heat to a solution to be purified in which solid matter is deposited upon the heat transfer means, comprising the steps of:
   heating a continuous flow of solid heat-transfer particles;
   causing the heated solid particles to contact the solution to be heated and purified in a counterflow relationship whereby solid matter from the solution is deposited upon the surfaces of said solid particles;
   thereafter abrading and impacting said solid particles to loosen the deposited solid matter therefrom;
   causing the abraded and impacted solid particles to contact incoming solution in a counterflow relationship to wash the loosened deposited solid matter from the solid particles;
   causing the washed solid particles to contact the purified solution in a counterflow relationship to further wash the solid particles; and
   reheating the cleaned solid particles for further contact with a solution to be heated.

3. A method of purifying a solution by heating and vaporization in which solid matter is deposited upon the heat transfer means, comprising the steps of:
   heating a flow of solid heat-transfer particles to a temperature above the vaporization temperature of the solution to be purified;
   causing the heated solid particles to contact the solution in a counterflow relationship whereby the solution is vaporized and solid matter from the solution is deposited upon the surfaces of said solid particles which are cooled;
   abrading and impacting the cooled solid particles to loosen the deposited solid matter therefrom;
   removing the loosened deposited solid matter from the solid particles to provide clean solid particles; and
   reheating the cleaned solid particles for further contact with the solution to be heated and vaporized.

4. A method of obtaining potable water from salt water, comprising the steps of:
   heating a flow of solid heat-transfer particles to a temperature above the vaporization temperature of salt water;
   causing the heated solid particles to contact a solution of salt water in a counterflow relationship whereby water is vaporized and solid matter from the solution is deposited upon the surface of said solid particles which are cooled;
   abrading and impacting the cooled solid particles to loosen the deposited solid matter therefrom;
   causing the abraded and impacted solid particles to contact a flow of incoming salt water to wash the loosened deposited solid matter from the solid particles; and condensing the water vapor.

5. A method of obtaining potable water of desired salinity from salt water, comprising the steps of:
   heating a continuous flow of solid heat-transfer particles to a temperature above the vaporization temperature of salt water;
   causing the flow of heated solid particles to contact a flow of a solution of salt water in a counterflow relationship whereby water is vaporized and solid matter from the solution is deposited upon the surfaces of said solid particles which are cooled;
   condensing the vapor to produce a purified water;
   abrading and impacting the cooled solid particles to loosen the deposited solid matter therefrom;
   washing the abraded and impacted solid particles with salt water to wash the loosened deposited solid matter therefrom; and
   contacting the salt water washed solid particles with said purified water to obtain the desired degree of salinity in the resultant potable water.

6. A method of obtaining potable water of desired salinity from salt water in a continuous process, comprising the steps of:
   heating a continuous flow of solid heat-transfer particles to a temperature above the vaporization temperature of salt water;
   causing the flow of heated solid particles to contact a flow of a solution of salt water in a counterflow relationship whereby water is vaporized and solid matter from the solution is deposited upon the surfaces of said solid particles which are cooled;
   condensing the vapor to produce a flow of purified water;
   abrading and impacting the cooled solid particles to loosen the deposited solid matter therefrom;
   causing a flow of abraded and impacted solid particles to contact a flow of incoming salt water in a counterflow relationship to wash the loosened deposited solid matter from the solid particles and cause salt water to wet said solid particles;
   diverting the flow of wetted solid particles from the incoming flow of salt water;
   causing the flow of wetted solid particles to contact the flow of purified water in a counterflow relationship to further wash the solid particles and to produce the desired salinity in the purified water; and
   reheating the flow of cleaned solid particles for recontacting the flow of salt water to be vaporized.

7. The method defined in claim 6 in which the loosened deposited solid matter and any worn solid particles are continuously removed from the system.

8. An apparatus for evaporating a liquid containing dissolved solid matter, comprising a vaporization chamber having upper and lower ends;

a vapor withdrawal outlet in communication with the upper end of said chamber;

means for heating a mass of solid heat-transfer particles;

an inlet adjacent the upper end of said chamber for introducing a stream of heated solid particles into said chamber for downward flow through said chamber;

passage means adjacent the lower end of the chamber for introducing a stream of liquid into the chamber in upward counterflow relationship with the downward flow of heated solid particles and for withdrawing said solid particles from the chamber;

means for abrading and impacting the solid particles withdrawn from the vaporization chamber to loosen any solid matter which might be deposited upon the surfaces of said solid particles in the vaporization chamber;

a wash chamber having upper and lower ends and containing means for elevating solid particles from adjacent the lower end to adjacent the upper end thereof;

an inlet adjacent the lower end of the wash chamber for introducing a stream of abraded and impacted solid particles into said chamber and onto said elevating means therein;

an inlet intermediate the ends of the wash chamber for introducing a stream of liquid into the wash chamber to flow downwardly over the solid particles being elevated from adjacent the lower end of the wash chamber and to wash the loosened solid matter therefrom; and an outlet adjacent the lower end of the wash chamber for discharging the loosened solid matter therefrom.

9. An apparatus for producing potable water from salt water containing dissolved solid matter, comprising:

a vaporization chamber having upper and lower ends;

a vapor withdrawal passageway in communication with the upper end of said chamber;

means for heating a mass of solid heat-transfer particles to a temperature above the vaporization temperature of salt water;

passage means in communication with the upper end of said chamber for introducing a stream of heated solid particles for downward flow through said chamber;

passage means in communication with the lower end of the chamber for introducing a stream of salt water in upward counterflow relationship with the downward flow of heated solid particles and for withdrawing said solid particles from the chamber;

a wash chamber having upper and lower ends and containing means for mechanically elevating said solid particles from adjacent the lower end to adjacent the upper end;

transfer passage means for the solid particles interconnecting the passage means in the lower end of the evaporation chamber with the wash chamber adjacent the lower end of the elevating means;

means associated with the transfer passage means for abrading and impacting solid particles passing therethrough from the vaporization chamber to loosen any solid matter which might be deposited upon the surfaces of said solid particles in the vaporization chamber;

an inlet intermediate the ends of the wash chamber for introducing a stream of salt water to be treated into the wash chamber to flow downwardly over the solid particles being elevated through said chamber to wash the loosened solid matter therefrom;

means for condensing the vapor from the vaporization chamber to provide a stream of purified water;

an inlet in the upper end of the wash chamber above the salt water inlet for introducing the stream of purified water into said wash chamber to flow downwardly over the solid particles which are being elevated;

an outlet in the wash chamber below the purified water inlet and above the salt water inlet for withdrawing potable purified water from said wash chamber;

an outlet adjacent the lower end of the wash chamber for discharging the loosened solid matter therefrom; and an outlet adjacent the upper end of the wash chamber for withdrawing the washed solid particles therefrom.

References Cited

UNITED STATES PATENTS

| | | | |
|---|---|---|---|
| 1,614,387 | 1/1927 | Pereda | 165—107 |
| 2,420,376 | 5/1947 | Johansson | 201—33 |
| 2,580,635 | 1/1952 | Winter | 165—107 |
| 2,953,524 | 9/1960 | Rich | 203—10 |
| 2,976,224 | 3/1961 | Gilliland | 203—100 |
| 2,977,292 | 3/1961 | Ellsworth | 203—10 |
| 3,032,482 | 5/1962 | Shoemaker | 203—100 |
| 3,242,975 | 3/1966 | Kogan | 165—107 |
| 3,335,083 | 8/1967 | Tidball | 203—100 |

WILBUR L. BASCOMB, JR., *Primary Examiner.*

U.S. Cl. X.R.

165—107; 202—173, 174, 185, 234; 203—10, 11, 100